United States Patent
Sakimura et al.

(10) Patent No.: US 10,116,113 B2
(45) Date of Patent: Oct. 30, 2018

(54) PLANAR WAVEGUIDE LASER APPARATUS

(71) Applicant: Mitsubishi Electric Corporation, Tokyo (JP)

(72) Inventors: Takeshi Sakimura, Tokyo (JP); Yuhi Kono, Tokyo (JP); Kohei Sakai, Tokyo (JP); Yukari Takada, Tokyo (JP); Yojiro Watanabe, Tokyo (JP); Fumio Shoda, Tokyo (JP); Takayuki Yanagisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/737,590

(22) PCT Filed: Aug. 7, 2015

(86) PCT No.: PCT/JP2015/072514
§ 371 (c)(1),
(2) Date: Dec. 18, 2017

(87) PCT Pub. No.: WO2017/026005
PCT Pub. Date: Feb. 16, 2017

(65) Prior Publication Data
US 2018/0198250 A1     Jul. 12, 2018

(51) Int. Cl.
*H01S 3/063*     (2006.01)
*H01S 3/094*     (2006.01)

(52) U.S. Cl.
CPC .............. *H01S 3/063* (2013.01); *H01S 3/094* (2013.01)

(58) Field of Classification Search
CPC .................................. H01S 3/094; H01S 3/063
(Continued)

(56) References Cited

U.S. PATENT DOCUMENTS 6,738,396 B2 *   5/2004   Filgas ................ B23K 26/0648
                                                       372/19
2003/0012246 A1   1/2003   Klimek et al.
(Continued)

FOREIGN PATENT DOCUMENTS

FR       2 909 807 A1     6/2008
JP       H05-165070 A     6/1993
(Continued)

OTHER PUBLICATIONS

International Search Report issued in PCT/JP2015/072514; dated Oct. 20, 2015.
(Continued)

*Primary Examiner* — Tuan Nguyen
(74) *Attorney, Agent, or Firm* — Studebaker & Brackett PC

(57) ABSTRACT

There are provided: a planar waveguide in which claddings (2) and (3) each having a smaller refractive index than a laser medium for absorbing pump light (5) are bonded to an upper surface (1a) and a lower surface (1b) of a core (1) which is formed from the laser medium; pump light generation sources (4a) and (4b) for emitting pump light (5) to side surfaces (1c) and (1d) of the core (1); and laser light high reflection films (6a) and (6b) formed on side surfaces (1e) and (1f) of the core (1). Each of side surfaces (2e) and (2f) of the cladding (2) corresponding to the side surfaces (1e) and (1f) of the core (1) has a ridge structure (20) in which a part thereof is recessed.

7 Claims, 4 Drawing Sheets

(58) Field of Classification Search
USPC .............................. 372/66, 64, 10; 359/333
See application file for complete search history.

(56) References Cited

U.S. PATENT DOCUMENTS

| | | | | |
|---|---|---|---|---|
| 2003/0063884 A1* | 4/2003 | Smith | .................... | G02B 6/032 385/129 |
| 2004/0218650 A1* | 11/2004 | Monty | .................. | H01S 3/0315 372/64 |
| 2006/0114961 A1* | 6/2006 | Manni | .................. | H01S 3/0941 372/70 |

FOREIGN PATENT DOCUMENTS

| | | | |
|---|---|---|---|
| JP | 2008-522409 A | 6/2008 | |
| JP | 2014-229738 A | 12/2014 | |
| WO | 2009/055894 A1 | 5/2009 | |
| WO | 2011/027731 A1 | 3/2011 | |

OTHER PUBLICATIONS

Written Opinion issued in PCT/JP2015/072514; dated Oct. 20, 2015.

The extended European search report issued by the European Patent Office dated Jul. 5, 2018, which corresponds to European Patent Application No. 15900960.4-1212 and is related to U.S. Appl. No. 15/737,590.

* cited by examiner

Absorbed Pump Light Power

Laser Medium Temperature

Laser Medium Refractive Index

PLANAR WAVEGUIDE LASER APPARATUS

TECHNICAL FIELD

The present invention relates to planar waveguide laser apparatuses for propagating laser light in a zig-zag manner within a core made from a laser medium and amplifying the laser light.

BACKGROUND ART

Patent Literature 1 shown below discloses a planar waveguide laser apparatus comprising a core made from a laser medium, and reflective coatings formed on opposite two side surfaces of the core out of four side surfaces of the core.

In this planar waveguide laser apparatus, laser light incident into the core propagates in a zig-zag manner while being repeatedly reflected between the two reflective coatings, so that the laser light is amplified.

Patent Literature 1 shown below further discloses a planar waveguide laser apparatus in which an angle of inclination is provided between two opposite side surfaces on which a reflective coating is formed.

In this planar waveguide laser apparatus, laser light incident from an incidence portion for the laser light propagates within a core in a zig-zag manner and is reflected, and the laser light that is reflected propagates backward within the core in a zig-zag manner, whereby the laser light is emitted from the same position as the incidence portion.

In the planar waveguide laser apparatus disclosed in Patent Literature 1 shown below, because the length of the propagation path of the laser light within the core of laser medium can be lengthened, high-gain amplification of the laser light can be carried out.

In addition, because in the planar waveguide laser apparatus, pump light is incident from a side surface of the core of laser medium, the overlap between the laser light and the pump light can be increased, and the laser light can be amplified efficiently.

CITATION LIST

Patent Literature

Patent Literature 1: US 2003/0063884 A1

SUMMARY OF INVENTION

Technical Problem

Because the conventional planar waveguide laser apparatus is constructed as above, the incident pump light is absorbed by the laser medium and therefore heat occurs in the core, so that a temperature distribution appears along the propagation direction of the pump light. Further, a temperature distribution appears also when the pump light has an intensity distribution. A problem with the temperature distribution is that a distribution of refractive indices appears in the core due to a thermal lens effect, and this distribution of refractive indices exerts an influence on the beam propagation state of the laser light propagating in the core.

More specifically, in the conventional planar waveguide laser apparatus, because the core and claddings that have different refractive indices are layered, guided modes are formed in the thickness direction of the planar waveguide (direction perpendicular to the waveguide layer structure), and the laser light can propagate in one or more predetermined propagation modes with respect to the thickness direction of the planar waveguide. These propagation modes can be controlled by appropriately setting the thickness of the core, and the difference in refractive index between the core and claddings.

On the other hand, as for the parallel direction with respect to the waveguide layer structure, no guided mode is formed, and thus the incident laser light propagates in the space as it is. A problem is that because, at this time, the laser light is affected by a thermal lens effect and so on, the wave front state of the laser light changes and the beam quality degrades, and the propagating direction of the beam also changes.

The present invention is made in order to solve the above-mentioned problems, and it is therefore an object of the present invention to obtain a planar waveguide laser apparatus that can form a guided mode also in the parallel direction with respect to a waveguide layer structure, and that can suppress a change in the wave front state of laser light and a change in the propagating direction of the laser light.

Solution to Problem

According to the present invention, there is provided a planar waveguide laser apparatus comprising: a planar waveguide comprising a core formed from a laser medium for absorbing pump light and claddings bonded to an upper surface and a lower surface of the core, each cladding having a smaller refractive index than the laser medium; a pump light generation source for emitting the pump light to a side surface of the core; and laser light reflection films formed on, out of four side surfaces of the core, two opposite side surfaces that are different from the side surface to which the pump light is emitted by the pump light generation source, wherein a structure of at least one side surface of two opposite side surfaces, out of four side surfaces of the planar waveguide, that are different from the side surface to which the pump light is emitted by the pump light generation source is a ridge structure in which a part of surface is recessed.

Advantageous Effects of Invention

According to the present invention, because at least one of the two opposite side surfaces which are included in the four side surfaces of the planar waveguide and which are different from the side surface to which the pump light is emitted by the pump light generation source has a ridge structure in which a part thereof is recessed, there is provided an advantage of being able to form a guided mode also in a direction which is parallel to the waveguide layer structure, and suppress a change in the wave front state of the laser light and a change in the propagating direction of the laser light.

DESCRIPTION OF EMBODIMENTS

Hereafter, to explain this invention in greater detail, embodiments of the present invention will be described with reference to the accompanying drawings.

Embodiment 1.

Figure 1:
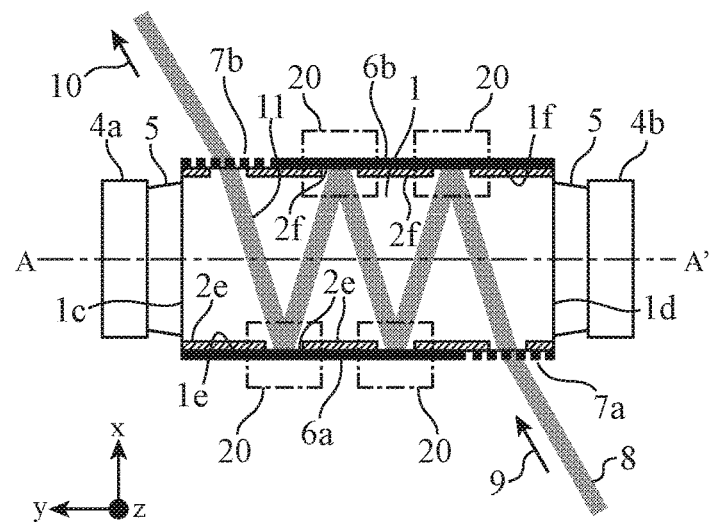
FIG. 1 is a top view showing a planar waveguide laser apparatus according to Embodiment 1 of the present invention.
Figure 2:
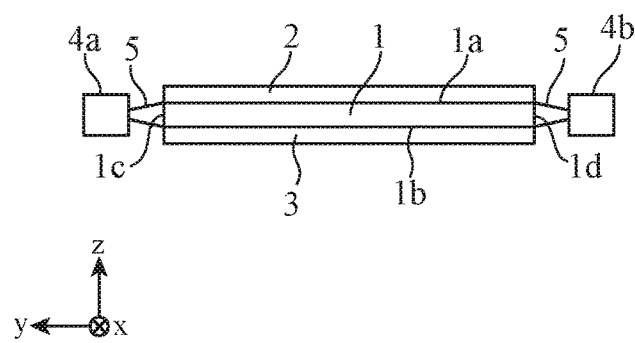
FIG. 2 is a cross-sectional view, taken along the A-A' line of FIG. 1, in a plane perpendicular to the page.

FIG. 1 is a top view showing a planar waveguide laser apparatus according to Embodiment 1 of the present invention, and FIG. 2 is a cross-sectional view, taken along the A-A' line of FIG. 1, in a plane perpendicular to the page. Further, FIG. 3 is a perspective view showing side surfaces 1e, 2e of a core 1 and a cladding 2 that construct a planar waveguide of the planar waveguide laser apparatus according to Embodiment 1 of the present invention.

Figure 3:
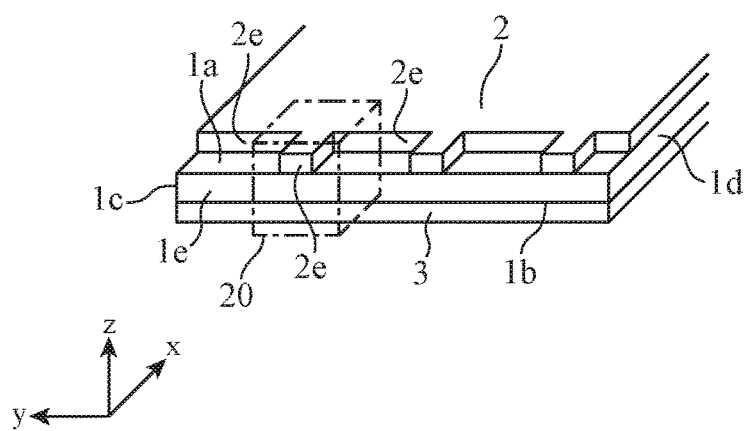
FIG. 3 is a perspective view showing side surfaces 1e, 2e of a core 1 and a cladding 2 that construct a planar waveguide of the planar waveguide laser apparatus according to Embodiment 1 of the present invention.

In the structure shown in FIGS. 1 to 3, the core 1 is formed from a laser medium that absorbs pump light 5, and the cladding 2 and a cladding 3 each having a smaller refractive index than the laser medium are bonded to an upper surface 1a and a lower surface 1b, which are main surfaces of the core 1.

The core 1 and claddings 2, 3 constitute the planar waveguide.

In this embodiment, the core 1, which is made from the laser medium, has a flat shape having a thin thickness in an axial direction. In FIGS. 1 to 3, a direction of the thickness of the core 1 is defined as z axis, and two axes in a flat surface of the core 1 are defined as x axis and y axis.

In the figures, in the core 1, the upper surface 1a and the lower surface 1b are parallel to an xy plane, and four side surfaces 1c, 1d, 1e, and 1f are parallel to a direction of the z axis.

Although in this Embodiment 1 an example in which the side surfaces 1c, 1d of the core 1 are substantially perpendicular to the upper surface 1a and the lower surface 1b, which are the main surfaces of the core 1, is illustrated, the side surfaces 1c, 1d of the core 1 may be inclined at am angle with respect to the upper surface 1a and lower surface 1b of the core 1. In this case, amplified spontaneous emission (ASE) and parasitic oscillation due to round trip paths caused by the side surfaces 1c, 1d, 1e, and 1f of the core 1 can be prevented.

As a laser medium of the core 1, a common solid state laser material, such as crystal, ceramic or glass, doped with an active medium, such as Nd, Yb, Er, Tm, or Ho, can be used. As a solid state laser material, a suitable material is selected according to a wavelength of laser light for which laser oscillation or amplification is to be performed.

Out of four side surfaces of the cladding 2, the side surface 2e corresponds to the side surface 1e of the core 1, and a side surface 2f corresponds to the side surface 1f of the core 1.

The cladding 2 is bonded to the upper surface 1a of the core 1, and the cladding 3 is bonded to the lower surface 1b of the core 1. Bonding of the claddings 2, 3 to the upper surface 1a and lower surface 1b of the core 1 may be carried out by, for example, vapor deposition of a film made from an optical material. Alternatively, bonding of claddings 2, 3 to the core 1 may be performed optically by, for example, optical contacting or diffusion bonding of optical materials.

The claddings 2, 3 may be bonded to a substrate not illustrated. Further, the substrate may be bonded to a heat sink not illustrated. The substrate and the heat sink may be bonded to an outer surface of either of the claddings 2 and 3, or may be bonded to an outer surface of each of both the claddings. It is preferable that a bonding material having good heat conductivity is used for the bonding.

A pump light generation source 4a is a first light source arranged close to the side surface 1c of the core 1, and the pump light generation source 4a emits pump light 5 to the side surface 1c of the core 1.

A pump light generation source 4b is a second light source arranged close to the side surface 1d of the core 1, and the pump light generation source 4b emits pump light 5 to the side surface 1d of the core 1.

As the pump light generation sources 4a and 4b, for example, a multi-emitter semiconductor laser, a broad-area laser diode (LD), or output fibers of fiber output LDs arranged in an array can be used. Although not illustrated in FIGS. 1 and 2, a heat sink for cooling may be bonded to the pump light generation sources 4a and 4b, as needed.

Each pump light generation sources 4a, 4b emits pump light 5 having a suitable angle of divergence in such a way that the pump light 5 propagates in a direction of the y axis while being confined inside the planar waveguide. At this time, it is preferable that the size in a direction of the x axis of the pump light 5 is nearly equal to the size in the direction of the x axis of the core 1 of laser medium.

Although in the example shown in FIGS. 1 and 2, the pump light generation sources 4a and 4b are arranged close to the side surfaces 1c and 1d of the core 1, optical components, such as lenses, can be alternatively arranged between the pump light generation source 4a and the side surface 1c of the core 1 and between the pump light generation source 4b and the side surface 1d of the core 1, so that the pump light 5 in a collimated or condensed state is incident upon the core 1.

Further, an antireflection film that allows the pump light 5 to pass therethrough may be formed on each of the side surfaces 1c and 1d of the core 1.

Further, although in the example shown in FIGS. 1 and 2, the pump light generation sources 4a and 4b are arranged close to the side surfaces 1c and 1d of the core 1, it is sufficient that either of the pump light generation sources 4a and 4b is arranged close to the side surface 1c or 1d of the core 1.

A laser light high reflection film 6a is a reflection film for reflecting laser light 11 that propagates within the core 1, and is formed on a portion of the side surface 1e of the core 1, the portion excluding an incidence portion upon which laser light 8 is incident from the outside. In FIG. 1, the incidence portion is formed at a right end of the side surface 1e of the core 1 in the figure, and the laser light 8 is incident into the core 1 in an incidence direction 9.

A laser light high reflection film 6b is a reflection film for reflecting the laser light 11 that propagates within the core 1, and is formed on a portion of the side surface 1f of the core 1, the portion excluding an emission portion from which the laser light 11 is emitted. In FIG. 1, the emission portion is formed at a left end of the side surface 1f of the core 1 in the figure, and the laser light 11 is emitted, in an emission direction 10, to outside the core 1.

The laser light high reflection films 6a, 6b are formed on the side surfaces 1e, 1f of the core 1 by, for example, vapor deposition of a film made from optical material (e.g., a dielectric multilayer film).

A laser light antireflection film 7a is a transmission film that allows the laser light 8 to pass therethrough, and is formed on the incidence portion of the side surface 1e of the core 1 upon which the laser light 8 is incident from the outside.

A laser light antireflection film 7b is a transmission film that allows the laser light 11 to pass therethrough, and is formed on the emission portion of the side surface 1f of the core 1 from which the laser light 11 propagated inside the core 1 is emitted.

The laser light antireflection films 7a, 7b are formed on the side surfaces 1e, 1f of the core 1 by, for example, vapor deposition of a film made from optical material (e.g., a dielectric multilayer film).

A ridge structure 20 is a structure in which a part of a surface of the cladding 2 which constructs the planar waveguide is recessed. More specifically, the ridge structure 20 is a structure in which part of the side surfaces 2e and/or 2f of the cladding 2 corresponding to the side surfaces 1e, 1f of the core 1 is set back in the x-axis direction from the corresponding side surfaces 1e, 1f of the core 1, so that a projection and a depression are formed in the side surfaces 2e, 2f of the cladding 2.

Because the ridge structure 20 is formed, the thickness at a side surface(s) of the planar waveguide is partially thin and the structure of the planar waveguide is not uniform in the y-axis direction, and thus a guided mode is formed also in the y-axis direction, which is parallel to the waveguide layer structure. This guided mode is determined by the width, the thickness, etc., of the ridge structure 20. In Embodiment 1, the guided mode is determined in such a way as to match a propagation mode of the laser light 11 incident into the core 1.

In the example shown in FIG. 3, by removing part of the cladding 2 in the side surface 2e, out of the four side surfaces of the cladding 2 bonded to the upper surface 1a of the core 1, which corresponds to the side surface 1e of the core 1, the ridge structure 20 is formed.

Although in the example shown in FIG. 3, three ridge structures 20 are formed in the side surface 2e of the cladding 2, this is only an example, and one or two ridge structures 20, or four or more ridge structures 20 may be formed in the side surface.

Next, operations will be explained.

Laser light 8 is incident into the core 1 from the outside along the incidence direction 9.

A beam of pump light 5 that is emitted from the pump light generation source 4a is incident from the side surface 1c of the core 1 of laser medium, while a beam of pump light 5 that is emitted from the pump light generation source 4b is incident from the side surface 1d of the core 1 of laser medium.

These beams of pump light 5 incident into the core 1 propagate in the y-axis direction while being absorbed by the laser medium.

Within the core 1, the pump light 5 is absorbed by the laser medium, and, as a result, the active medium is excited and population inversion is generated. As a result of the generation of the population inversion, a gain for the laser light 11 that propagates in the core 1 is generated.

Because of this generation of gain, the laser light 11 propagating in the core 1 is amplified, and the laser output of the core 1 is increased.

Thus, by preparing laser seed light as the laser light 8, and causing the laser seed light to be incident into the core 1 and then causing the laser seed light to be amplified, the planar waveguide laser apparatus according to Embodiment 1 operates as a laser amplifier.

Further, by arranging not-illustrated output mirrors for reflecting a portion of laser light on the laser optical axis of the planar waveguide laser apparatus in such a way that the output mirrors are perpendicular to the laser optical axis, the planar waveguide laser apparatus according to Embodiment 1 operates as a laser oscillator.

Therefore, in the following explanation, unless otherwise explained, the planar waveguide laser apparatus is used for both a laser oscillator and a laser amplifier.

Next, the propagation path of the laser light 11 that propagates in the xy plane after the laser light 8 is incident from the laser light antireflection film 7a formed on the side surface 1e of the core 1 will be explained.

The laser light 8 incident from the laser light antireflection film 7a is incident at an angle of incidence shown by the incidence direction 9.

As a result, the laser light 11 propagated inside the core 1 reaches the side surface 1f of the core 1, as shown in FIG. 1. Because the laser light high reflection film 6b is formed on the side surface 1f of the core 1, the laser light 11 which has reached the side surface 1f of the core 1 is reflected by the side surface 1f of the core 1.

The laser light 11 reflected by the side surface 1f of the core 1 propagates again within the core 1, and then reaches the side surface 1e of the core 1. Because the laser light high reflection film 6a is formed on the side surface 1e of the core 1, the laser light 11 which has reached the side surface 1e of the core 1 is reflected by the side surface 1e of the core 1.

The laser light 11 propagates in a zig-zag manner because of the repeated reflections by the laser light high reflection films 6a, 6b, and travels in the direction of the y axis, as shown in FIG. 1.

The laser light 11 is amplified in the course of the propagation thereof in the core 1 of laser medium, and, after being reflected several times by the laser light high reflection films 6a and 6b, reaches the side surface 1f of the core 1 on which the laser light antireflection film 7b is formed.

As a result, the amplified laser light 11 passes through the laser light antireflection film 7b, and is emitted to the outside at an angle of emergence shown by the emission direction 10.

Here, the width in the y direction of the core 1 and the length in the x direction of the core 1 in the xy plane of the core 1 of laser medium, the beam width of the incident laser light 8, and the width of each of the laser light antireflection films 7a and 7b are set in such a way that the beam overlap efficiency of the laser light 11 propagated in the core 1 becomes high, and the length of the propagation path of the laser light 11 becomes long.

Usually, when the setting is carried out in such a way that the number of times that the laser light 11 is reflected increases, the length of the propagation path of the laser light 11 becomes long, and a high gain is acquired.

In the structure in which the laser light 11 propagates while the laser light is repeatedly reflected by the laser light high reflection films 6a, 6b, as shown in FIG. 1, a high-power laser output can be acquired with a high gain because the length of the propagation path of the laser light 11 can be lengthened.

Next, the propagation of the laser light 11 in an xz plane extending in a direction of the thickness of the core 1 will be explained.

Because there is a difference in refractive index between the core 1 and the claddings 2 and 3, the core 1 serves, in the xz plane extending in a direction of the thickness of the core 1, as a waveguide in which the laser light 11 propagates while being confined in the core 1.

In the waveguide, the laser light 11 propagates with a specific electromagnetic field distribution, which is called a guided mode.

This guided mode is determined by the wavelength of the laser light 11, the refractive index difference between the core 1 and the claddings 2, 3, and the thickness of the core 1. In general, the number of modes decreases with increase in the wavelength of the laser light 11, with decrease in the refractive index difference, and with decrease in the thickness of the core 1. A waveguide in which only a single waveguide mode can be guided is called a single mode waveguide.

With the waveguide shape and the laser light propagation path which are shown in FIGS. 1 and 2, the laser light 11 propagates in one or more guided modes of the waveguide in the direction of the z axis. Therefore, it becomes possible to improve the beam quality of the outputted laser light by designing the guided mode appropriately. Further, because confining the laser light 11 in the direction of the z axis makes it possible to increase the power density of the laser light 11, high-efficiency amplification of the laser light can be carried out.

The beams of pump light 5 emitted from the pump light generation sources 4a, 4b are incident from the side surfaces 1c, 1d of the core 1.

The core 1 of laser medium serves as a waveguide in which the pump light 5 propagates while being confined in the core 1, because of the refractive index difference between the core and the claddings 2 and 3, like in the case of the laser light 11. More specifically, the pump light 5 forms a guided mode with respect to the direction of the z axis, and propagates in the direction of the y axis while being absorbed by the laser medium.

Here, when the incidence power of pump light 5 is expressed by $P_{pin}$ [W], the coefficient of absorption of the pump light 5 by the laser medium is expressed by $\alpha_p$ [1/m], and the propagation length in the y-axis direction is expressed by L with the position of the side surface 1d of the core 1, which is an end at which the pump light 5 is incident, being set as a point of origin, the pump light power $P_p(L)$ is expressed by the following equation (1).

$$P_p(L) = P_{pin} \times \exp^{-\alpha_p \times L} \tag{1}$$

Further, the power $P_{pabs}(\Delta L)$ of the pump light absorbed within a section $\Delta L$ ranging from L to $(L+\Delta L)$ is expressed by the following equation (2).

$$P_{pabs}(\Delta L) = P_p(L) - P_p(L+\Delta L) \tag{2}$$

FIG. 4 is an explanatory drawing showing the power of the pump light which is absorbed by the laser medium, and the temperature and the refractive index of the core 1 of laser medium.

Figure 4A:
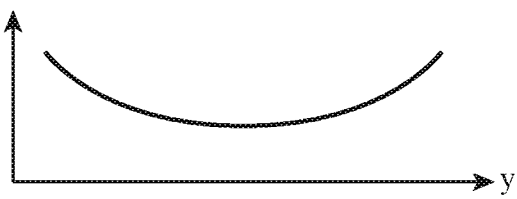
FIG. 4 is an explanatory drawing showing pump light power absorbed by a laser medium, and the temperature and the refractive index of the core 1 of laser medium.

In the structure shown in FIG. 1, because beams of the pump light 5 are incident from the two side surfaces 1c and 1d of the core 1, the pump light power absorbed by the laser medium has a distribution (pump light power distribution) in the shape of a curve as shown in FIG. 4A, in the y-axis direction. On the y axis, the position at the left end of this curve corresponds to the position of the side surface 1c of the core 1, and the position at the right end of the curve corresponds to the position of the side surface 1d of the core 1.

The laser medium gets to a excited state as a result of the absorption of the pump light power by the laser medium, and energy is released as heat in a transition between energy levels that have no relation to the induced emission of the laser light 11. As a result, the temperature of the core 1 rises according to the pump light power absorbed by the laser medium.

Figure 4B:
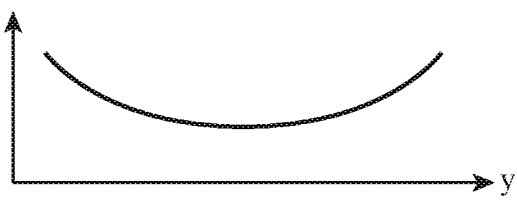

In the direction of the y axis, the temperature of the core 1 of laser medium has a distribution (temperature distribution) in the shape of a curve as shown in FIG. 4B.

As a result of change in the temperature of the core 1 of laser medium, the refractive index of the laser medium changes.

The amount of change in the refractive index n at the temperature T is expressed by dn/dT. When the amount of change dn/dT in the refractive index n has a positive value, the refractive index n increases with increase in the temperature, whereas when the amount of change dn/dT in the refractive index n has a negative value, the refractive index n decreases with increase in the temperature.

Figure 4C:
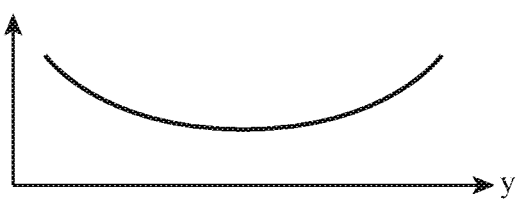

When the amount of change dn/dT in the refractive index n has a positive value, the refractive index of the core 1 of laser medium has a distribution (laser medium refractive index distribution) in the shape of a curve as shown in FIG. 4C.

Thus, as a result of the incidence of the beams of the pump light 5 emitted from the pump light generation sources 4a and 4b into the core 1, a distribution of refractive index appears in the core 1 with respect to the direction of the y axis.

When the laser light 11 propagates along the optical path as shown in FIG. 1, the laser light 11 passes through the laser medium in which the distribution of the refractive index distribution exists.

Because the laser light 11 propagates in one or more guided modes of the waveguide with respect to the z axis, the laser light 11 is not affected by the refraction distribution. On the other hand, in the xy plane, because the laser light 11 propagates in a spatial mode of the incident laser light 11, the refractive index differs in accordance with beam areas within a beam cross section of the laser light 11 in a yz plane.

In this case, for example, in an optical path along which the laser light 11 travels from the laser light antireflection film 7a to the side surface 1f of the core 1, the refractive index of an area on a right side with respect to the traveling direction of the laser light 11 is large while the refractive index of an area on a left side with respect to the traveling direction is small.

As explained above, because there occurs a difference in the refractive index in accordance with beam areas within the beam cross section of the laser light 11, and the laser light 11 has a property of being refracted toward an area having a larger refractive index, a change (aberration) occurs in the wavefront curvature of the laser light 11 in the xy plane, and the propagation mode changes. Further, the traveling direction (propagation angle in the xy plane) of the laser light 11 changes.

Therefore, a problem is that in the course in which the laser light 11 propagates along a long path which is formed of reflective paths, the propagation mode and the traveling direction of the laser light 11 change greatly, and, as a result, a stable operation cannot be performed.

Accordingly, in Embodiment 1, the ridge structures 20 are formed in the side surfaces 2e, 2f of the cladding 2 which correspond to the side surfaces 1e, 1f of the core 1.

Each ridge structure 20 is one in which the planar waveguide has a structure non-uniform in the direction of the y axis, as shown in FIG. 3.

As shown in FIG. 1, the cladding 2 is constructed in such a way that, in the side surfaces 2e, 2f which correspond to the side surfaces 1e, 1f of the core 1, out of the four side surfaces of the cladding 2 bonded to the upper surface 1a of the core 1, the cladding 2 exists only on areas (referred to as "laser light reflection areas" from here on) which are formed of both areas of the side surfaces 1e, 1f of the core 1 which reflect the laser light 11 and their surrounding areas, and the cladding 2 is removed on areas except the laser light reflection areas. More specifically, on each of the laser light reflection areas, one of the side surfaces 2e, 2f which correspond to the side surfaces 1e, 1f of the core 1 is flush with the corresponding one of the side surfaces 1e, 1f of the core 1. In contrast, on any area except the laser light reflection areas, one of the side surfaces 2e, 2f of the cladding 2 is constructed so as to be set back, in a direction of the x axis, from the corresponding one of the side surfaces 1e, 1f of the core 1. Thus, each side surface 2e, 2f of the cladding 2 is constructed in such a way that a part thereof is recessed.

Because the ridge structures 20 are formed, with respect to the direction of the y axis, the effective refractive index of areas from which the cladding 2 is removed, except the laser light reflection areas, is smaller than that of the laser light reflection areas. Therefore, one or more guided modes are formed also in the direction of the y axis. As a result, the laser light 11 can be propagated in guided modes both in the direction of the z axis and in the direction of the y axis.

As for the laser light 11 incident into the core, a component which has become a higher order mode as a result of a change in the wavefront curvature and a component of the laser light 11 that has changed its traveling direction (propagation angle in the xy plane) become a loss when being incident upon each portion in which the ridge structure 20 is formed.

More specifically, components which cannot be coupled to a guided mode formed by the ridge structures 20 become a radiation mode and is not propagated any longer, and therefore a component which has become a higher order mode as a result of a change in the wavefront curvature and a component which has changed the traveling direction become a radiation mode and are not propagated any longer because the components cannot be coupled to a guided mode formed by the ridge structures 20. Therefore, a loss occurs when the laser light is incident upon each portion in which a ridge structure 20 is formed.

As a result, for the laser light 11, the propagation mode can be made small (the beam quality can be improved) not only with respect to the direction of the z axis, but also with respect to the direction of the y axis. Further, the positions at each of which the laser light 11 is reflected can be fixed, and the propagating direction of the laser light 11 can be stabilized.

In FIG. 3, the example in which each of the ridge structures 20 is formed by removing a part of the cladding 2 is shown. More specifically, by removing the cladding 2 on the areas except the laser light reflection areas, the ridge structures 20 are formed. However, the ridge structures 20 are not limited to this example.

Figure 5:
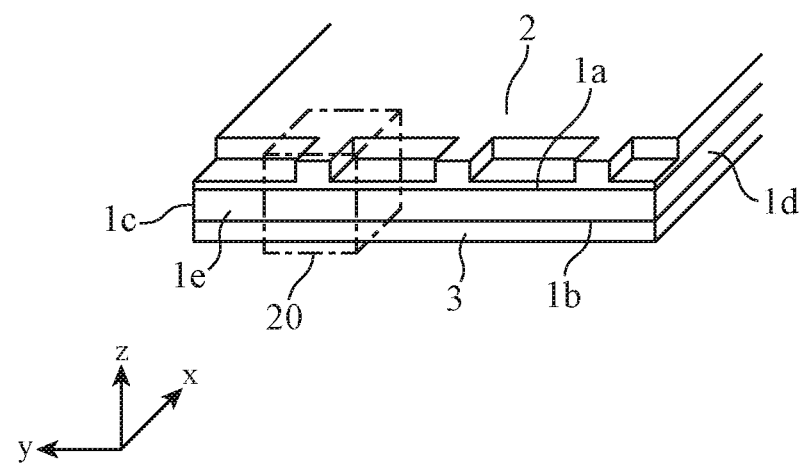
FIG. 5 is a perspective view showing side surfaces 1e, 2e of a core 1 and a cladding 2 which construct a planar waveguide of another example of the planar waveguide laser apparatus according to Embodiment 1 of the present invention.

For example, as shown in FIG. 5, instead of the ridge structures in each of which the cladding 2 on an area except the laser light reflection areas is removed perfectly, there can be provided ridge structures 20 in each of which the cladding 2 on an area except the laser light reflection areas has a thinner thickness than that of the cladding 2 on the laser light reflection areas.

Figure 6:
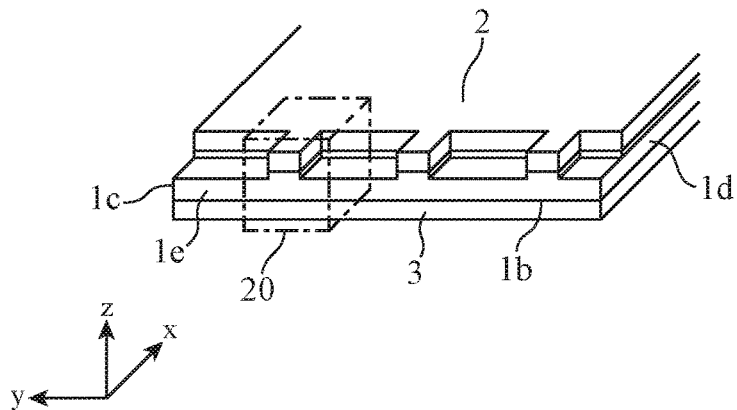
FIG. 6 is a perspective view showing side surfaces 1e, 2e of a core 1 and a cladding 2 which construct a planar waveguide of a further example of the planar waveguide laser apparatus according to Embodiment 1 of the present invention.

As an alternative, there can be provided ridge structures 20 in each of which a part of the cladding 2 and the core 1 which construct the planar waveguide is removed. For example, as shown in FIG. 6, there are provided ridge structures 20 in each of which the cladding 2 on an area except the laser light reflection areas is removed perfectly, and the core 1 in the area except the laser light reflection areas has a thinner thickness than that of the core 1 in the laser light reflection areas.

Because the guided mode formed by the ridge structures 20 can be controlled by the shape of the ridge structures 20, it is preferable to design the ridge structures 20 in such a way that a desired propagation mode is provided as the propagation mode of the laser light.

Further, because the ridge structures 20 can be formed by using processing such as polishing, dicing, or etching, the ridge structures 20 can be formed even after the claddings 2 and 3 are bonded to the core 1 of laser medium to produce a planar waveguide.

Further, because the ridge structures 20 are formed only in side surfaces of the planar waveguide, the processing is easily carried out. As the method of processing the ridge structures 20, an appropriate method is selected in consideration of the processing accuracy, a scattering loss upon the laser light 11, etc.

Because each ridge structure 20 is formed in a part of side surfaces of the planar waveguide, the influence on the propagation of the pump light 5 incident into the core 1 is small.

In the structure in which beams of the pump light 5 are incident from the side surfaces 1c, 1d of the core 1, the excitation density can be increased and high-gain amplification can be carried out because the pump light 5 with high-power can be introduced into the core 1.

As can be seen from the above description, according to Embodiment 1, because each of the side surfaces 2e, 2f of the cladding 2 which correspond to the side surfaces 1e, 1f of the core 1 is constructed to have a ridge structure 20 in which a part thereof is recessed, there is provided an advantage of forming a guided mode also in the direction of the y axis which is parallel to the waveguide layer structure, thereby being able to suppress a change in the wave front state of the laser light 11 and a change in the propagating direction of the laser light 11.

Although in this Embodiment 1 the example in which the claddings 2, 3 are bonded to the upper surface 1a and the lower surface 1b of the core 1 is shown, a double cladding structure in which other claddings are bonded to outer surfaces of the claddings 2, 3 can be alternatively employed.

In this case, when the cladding bonded to the outer surface of the cladding 2 is referred to as a first outer cladding and the cladding bonded to the outer surface of the cladding 3 is referred to as a second outer cladding, a structure in which the cladding 3, the core 1, the cladding 2, and the first outer cladding are layered in order on the second outer cladding which is the bottom layer is formed.

The double cladding structure makes it possible to use a high-power pump light generation source with lower brightness and carry out amplification with a higher gain.

Although the example in which the outer claddings are bonded to both of the claddings 2, 3 is shown above, an outer cladding can be alternatively bonded to either of the claddings 2 and 3.

Although in Embodiment 1 the example in which both the side surfaces 2e, 2f of the cladding 2 have ridge structures 20 is shown, only either of the side surfaces 2e, 2f of the cladding 2 can be alternatively constructed so as to have a ridge structure 20. Because a guided mode can be formed in the direction of the y axis also in this case, a change in the wave front state of the laser light 11 and a change in the propagating direction of the laser light 11 can be suppressed similarly.

Further, one side surface of the cladding 3 can have a ridge structure 20.

Figure 7:
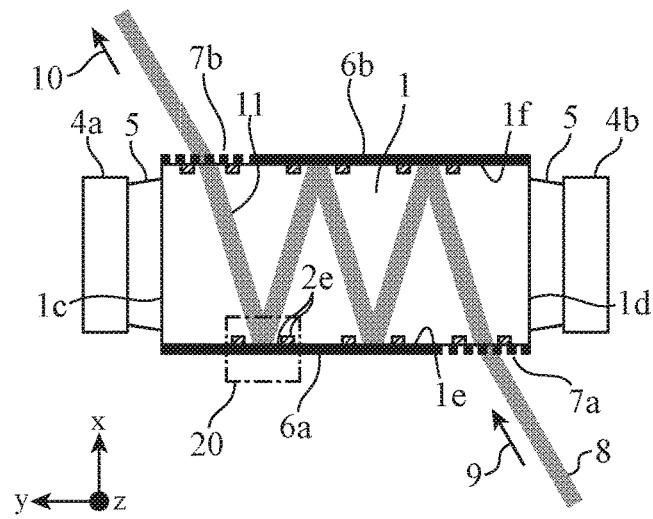
FIG. 7 is a top view showing another example of the planar waveguide laser apparatus according to Embodiment 1 of the present invention.

In Embodiment 1, shown are the ridge structures 20 formed on side surfaces 2e, 2f of the cladding 2 in which all the side surfaces 2e, 2f of the cladding 2 except the laser light reflection areas is removed. Instead, as shown in FIG. 7, a ridge structure in which the cladding 2 only in the vicinity of a portion on the laser light reflection area is removed may be applied.

Further, in the incidence portion of the laser light 8 (portion in which the laser light antireflection film 7a is formed) or in the emission portion (portion in which the laser light antireflection film 7b is formed) of the laser light 11 at which the influence of a change in the wave front state and a change in the light propagation path upon the laser light 11 is small, the formation of a ridge structure 20 may be omitted.

Figure 8:
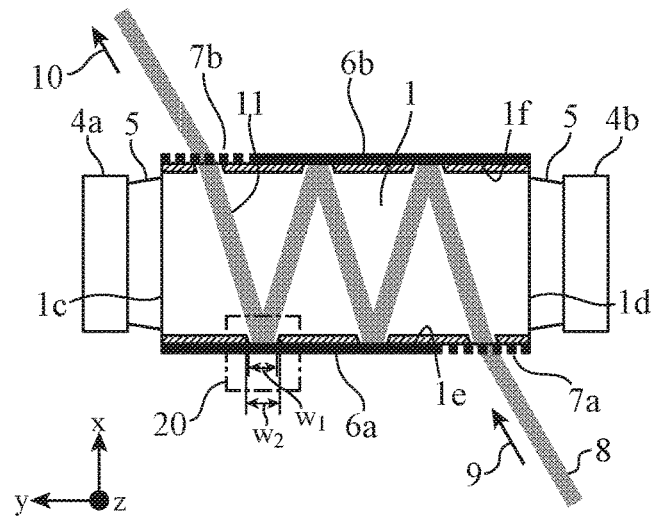
FIG. 8 is a top view showing a further example of the planar waveguide laser apparatus according to Embodiment 1 of the present invention.

Further, each ridge structure 20 may be formed so as to have angles matching the angle of incidence and the angle of reflection of the laser light 11, as shown in FIG. 8. In the example shown in FIG. 8, a width $w_1$ of the end of the protruding portion in each ridge structure 20 is narrower than a width $w_2$ of the basal portion.

In the case in which each ridge structure is formed so as to have angles, as explained above, it becomes easy to match a guided mode formed by the ridge structures 20 with a propagation mode of the laser light 11, and a loss upon the laser light 11 can be reduced.

Figure 9:
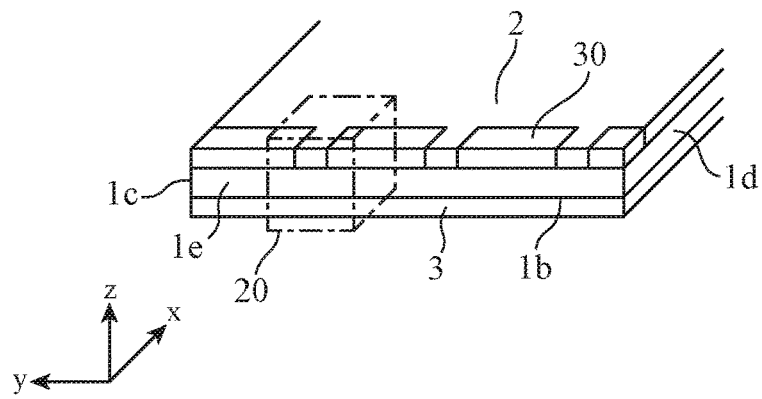
FIG. 9 is a perspective view showing side surfaces 1e, 2e of a core 1 and a cladding 2 which construct a planar waveguide of a further example of the planar waveguide laser apparatus according to Embodiment 1 of the present invention.

Although in this Embodiment 1 the example in which the ridge structures 20 are formed by removing the cladding 2 on the areas except the laser light reflection areas is shown, a low refractive index material 30 whose refractive index is smaller than that of the cladding 2 may be provided in the areas from which the cladding 2 is removed, as shown in FIG. 9.

Because the low refractive index material 30 has a smaller refractive index than the cladding 2, a guided mode is formed also in the direction of the y axis. The formation of the low refractive index material 30 makes it possible to prevent the adhesion of dirt and dust to the core 1 of laser medium. Further, a stress that is generated when the cladding 2 is bonded to a substrate or the like can be reduced.

The low refractive index material 30 can be disposed in such a way as to have a thinner thickness than the cladding 2.

Embodiment 2.

Although in Embodiment 1 above the example in which the side surfaces 1e, 1f of the core 1 are parallel to each other is shown, an angle of inclination may be provided between the side surface 1e and the side surface 1f of the core 1.

Figure 10:
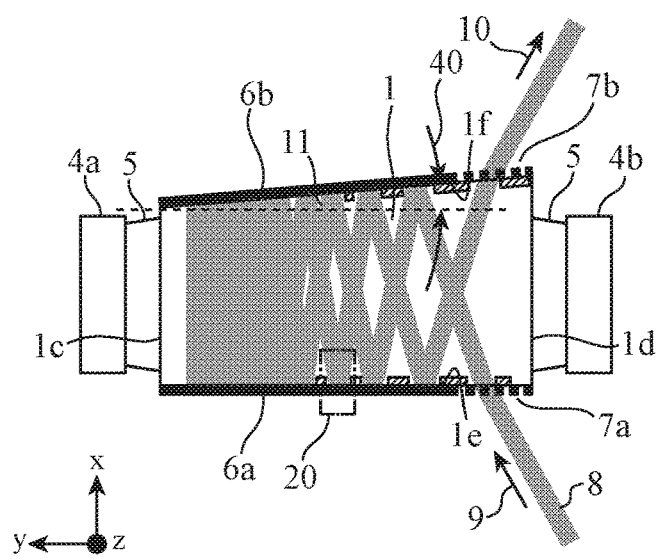
FIG. 10 is a top view showing a planar waveguide laser apparatus according to Embodiment 2 of the present invention.

FIG. 10 is a top view showing a planar waveguide laser apparatus according to Embodiment 2 of the present invention. In FIG. 10, because the same reference numerals as those shown in FIG. 1 denote the same components or like components, the explanation of the components will be omitted hereafter. Reference numeral "40" denotes an angle of inclination between a side surface 1e and a side surface 1f of a core 1.

In the planar waveguide laser apparatus shown in FIG. 10, the position of a laser light antireflection film 7b and the emission direction 10 of laser light 11 differ from those in the planar waveguide laser apparatus shown in FIG. 1. Further, a range within which ridge structures 20 are formed differs from that.

Next, operations will be explained.

Laser light 8 is incident into the core 1 in an incidence direction 9 from the outside, like that in above-explained Embodiment 1. Because the side surface 1f of the core 1 is inclined against the side surface 1e at degrees of the angle of inclination 40, the angle of incidence of the laser light 11 into each of the side surfaces 1e, 1f of the core 1 becomes small every time when the laser light 11 is reflected.

At a position where the angle of incidence of the laser light 11 into one of the side surfaces 1e, 1f of the core 1 is 0 degrees, the propagating direction of the laser light 11 is reversed and the laser light is reflected backward.

In the example shown in FIG. 10, the propagation path of the laser light 11 after the backward reflection intersects the propagation path of the laser light 11 before the backward reflection, and the laser light 11 is emitted, in the emission direction 10, from the laser light antireflection film 7b formed on a portion of the core shown on an upper right side of the figure to the outside.

The propagation path of the laser light 11 is decided by both the angle of inclination 40 between the side surface 1e and the side surface 1f of the core 1, and the incidence direction 9 of the laser light 8.

In the planar waveguide laser apparatus shown in FIG. 10, because the length of the propagation path of the laser light 11 within the core 1 of laser medium can be made to be longer than that in the planar waveguide laser apparatus shown in FIG. 1, high-gain amplification can be carried out. Further, because an area through which the laser light 11 passes in the laser medium increases, an overlap with the excited distribution is improved and the laser light 11 can be amplified with a high degree of efficiency. In addition, because the extraction of energy is improved, high-efficiency amplification can be carried out while ASE is suppressed.

In the planar waveguide laser apparatus shown in FIG. 10, although an overlap of the beams of the laser light 11 can cause an increase in the power density of the laser light 11 and an increase in the extraction of energy, the propagation mode may degrade in a portion in which there is an overlap of the beams of the laser light 11. In other words, the beam quality may degrade.

However, because the ridge structures 20 are formed, the propagation mode of the laser light 11 can be controlled. Therefore, a stable operation can be performed while a change in the wave front state of the laser light 11 and a change in the propagating direction of the laser light 11 are suppressed.

In the planar waveguide laser apparatus shown in FIG. 10, the ridge structures 20 are formed only within regions that are close to an incidence portion and an emission portion of the laser light 8. In the figure, while the ridge structures 20 are formed on the right side, no ridge structures 20 are formed on the left side.

As a result, a range that is controllable by the ridge structures 20 is limited to an initial propagation mode of the laser light 11 in the vicinity of the incidence portion and the propagation mode of the laser light 11 in the vicinity of the emission portion. Because the laser light power has a larger value in the vicinity of the emission portion, if the propagation mode in the vicinity of the emission portion can be controlled, the effect of stabilizing the propagation mode of the laser light is enhanced. Consequently, even if the range controllable by the ridge structures 20 is limited, a stable operation can be performed.

Embodiment 3.

In Embodiment 2 above, the example in which the laser light 11 is emitted in the emission direction 10 from the laser light antireflection film 7b formed on an upper right portion in FIG. 10 to the outside is shown. In contrast, the laser light 11 may be emitted in the emission direction 10 from the side surface 1e of the core 1 on which a laser light antireflection film 7a is formed to the outside.

Figure 11:
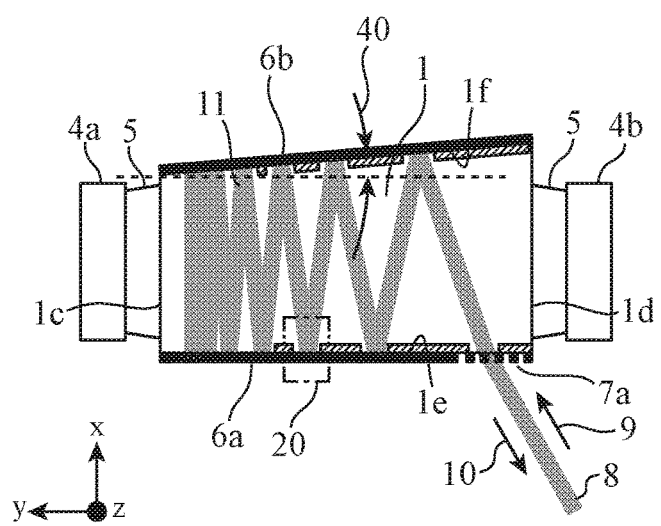
FIG. 11 is a top view showing a planar waveguide laser apparatus according to Embodiment 3 of the present invention.

FIG. 11 is a top view showing a planar waveguide laser apparatus according to Embodiment 3 of the present invention. In FIG. 11, because the same reference numerals as those shown in FIG. 10 denote the same components or like components, the explanation of the components will be omitted hereafter.

Next, operations will be explained.

Laser light 8 is incident into a core 1 in an incidence direction 9. Because a side surface 1f of the core 1 is inclined against a side surface 1e at degrees of an angle of inclination of 40, the angle of incidence of laser light 11 into each of the side surfaces 1e, 1f of the core 1 becomes small every time when the laser light 11 is reflected.

At a position where the angle of incidence of the laser light 11 into one of the side surfaces 1e, 1f of the core 1 is 0 degrees, the propagating direction of the laser light 11 is reversed and the laser light is reflected backward, like in the case of above-mentioned Embodiment 2.

Although in the example shown in FIG. 10 in Embodiment 2, the propagation path of the laser light 11 after the backward reflection intersects the propagation path of the laser light 11 before the backward reflection, the example shown in FIG. 11 differs from the example shown in FIG. 10 in that the propagation path of the laser light 11 after the backward reflection is on the same axis as the propagation path of the laser light 11 before the backward reflection.

As a result, the laser light 11 after the backward reflection is emitted, in an emission direction 10, from the side surface 1e of the core 1 on which a laser light antireflection film 7a is formed to the outside. Therefore, an incidence portion and an emission portion of the laser light are the same.

In the planar waveguide laser apparatus shown in FIG. 11, because the length of the propagation path of the laser light 11 within the core 1 which is the laser medium can be made to be longer than that in the planar waveguide laser apparatus shown in FIG. 1, high-gain amplification can be carried out. Further, because an area through which the laser light 11 passes in the laser medium increases, an overlap with an excited distribution is improved and the laser light 11 can be amplified with a high degree of efficiency. In addition, because the extraction of energy is improved, high-efficiency amplification can be carried out while ASE is suppressed.

Further, because in the planar waveguide laser apparatus shown in FIG. 11, it is not necessary to form a laser light antireflection film 7b on the side surface 1f of the core 1, the processing is facilitated.

The optical path of the incident laser light can be separated from that of the emitted laser light by using an optical circulator. An optical circulator can be configured using both a polarizer and a Faraday rotator or both a polarizer and a wavelength plate, for example.

In the planar waveguide laser apparatus shown in FIG. 11, although an overlap of the beams of the laser light 11 can cause an increase in the power density of the laser light 11 and an increase in the extraction of energy, the propagation mode may degrade in a portion in which there is an overlap of the beams of the laser light 11. In other words, the beam quality may degrade.

However, because ridge structures 20 are formed, the propagation mode of the laser light 11 can be controlled. Therefore, a stable operation can be performed while a change in the wave front state of the laser light 11 and a change in the propagating direction of the laser light 11 are suppressed.

In the planar waveguide laser apparatus shown in FIG. 11, the ridge structures 20 are formed only within regions that are close to the incidence portion and the emission portion of the laser light 8. In the figure, while the ridge structures 20 are formed on the right side, no ridge structures 20 are formed on the left side.

As a result, a range that is controllable by the ridge structures 20 is limited to an initial propagation mode of the laser light 11 in the vicinity of the incidence portion and the propagation mode of the laser light 11 in the vicinity of the emission portion. Because the laser light power has a larger value in the vicinity of the emission portion, if the propagation mode in the vicinity of the emission portion can be controlled, the effect of stabilizing the propagation mode of the laser light is enhanced. Consequently, even if the range controllable by the ridge structures 20 is limited, a stable operation can be performed.

It is to be understood that any combination of the embodiments can be made, various modifications can be made to any component of the embodiments, and any component can be omitted from the embodiments, within the scope of the invention.

INDUSTRIAL APPLICABILITY

The planar waveguide laser apparatus according to the present invention is suitable for use as a planar waveguide laser apparatus that needs to form a guided mode also in a direction parallel to the waveguide layer structure, thereby suppressing a change in the wave front state of the laser light and a change in the propagating direction of the laser light.

REFERENCE SIGNS LIST

1: core, 1a: upper surface of core, 1b: lower surface of core, 1c, 1d, 1e, 1f: side surface of core, 2: cladding, 2e, 2f: side surface of cladding, 3: cladding, 4a: pump light generation source (first light source), 4b: pump light generation source (second light source), 5: pump light, 6a, 6b: laser light high reflection film (laser light reflection film), 7a, 7b: laser light antireflection film, 8: laser light incident from outside, 9: incidence direction, 10: emission direction, 11: laser light propagated, 20: ridge structure, 30: low refractive index material, and 40: angle of inclination.

The invention claimed is:

1. A planar waveguide laser apparatus comprising:
a planar waveguide comprising a core formed from a laser medium for absorbing pump light and claddings bonded to an upper surface and a lower surface of the core, each cladding having a smaller refractive index than the laser medium;
a pump light generation source for emitting the pump light to a side surface of the core; and
laser light reflection films formed on, out of four side surfaces of the core, two opposite side surfaces that are different from the side surface to which the pump light is emitted by the pump light generation source, wherein
a structure of at least one side surface of two opposite side surfaces, out of four side surfaces of the planar waveguide, that are different from the side surface to which the pump light is emitted by the pump light generation source, the at least one side surface including at least one cladding surface and a core surface, and the structure of the at least one side surface is a ridge structure in which a part of the at least one side surface is recessed.

2. The planar waveguide laser apparatus according to claim 1, wherein the ridge structure is a structure in which a part of the at least one cladding surface is recessed.

3. The planar waveguide laser apparatus according to claim 1, wherein the ridge structure is a structure in which a part of the at least one cladding surface and the core surface is removed.

4. The planar waveguide laser apparatus according to claim 1, wherein a guided mode corresponding to a propagation mode of laser light incident into the core is formed by the ridge structure.

5. The planar waveguide laser apparatus according to claim 1, wherein another cladding is bonded to an outer surface of each cladding, which forms the planar waveguide.

6. The planar waveguide laser apparatus according to claim 1, wherein the pump light generation source comprises:
a first light source for emitting pump light to one side surface of the four side surfaces of the core; and
a second light source for emitting pump light to another one side surface of the four side surfaces of the core, the another one side surface being opposite to the one side surface to which the pump light is emitted by the first light source.

7. The planar waveguide laser apparatus according to claim 1, wherein an angle of inclination is provided between the two opposite side surfaces on which the laser light reflection films are formed.

\* \* \* \* \*